Feb. 27, 1951    J. W. CARLSON    2,543,687
VENDING MACHINE
Filed Jan. 23, 1943    11 Sheets-Sheet 4
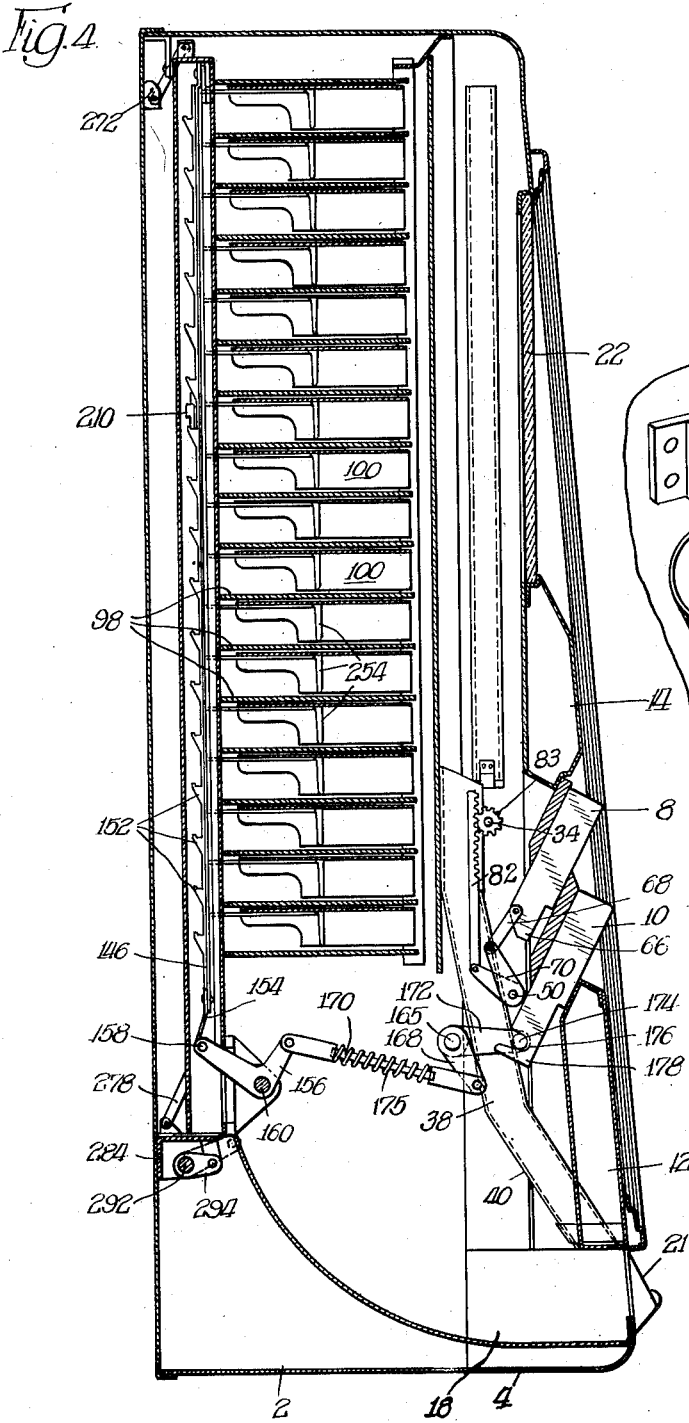
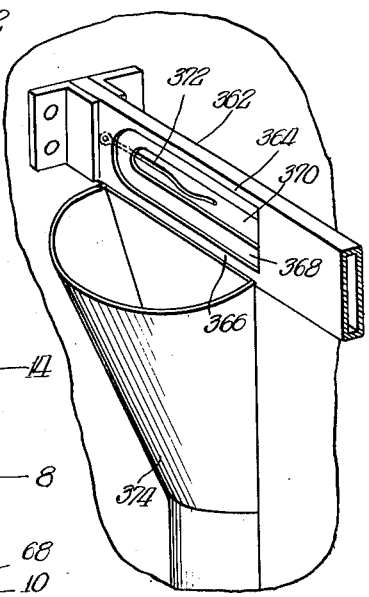
Inventor:
John W. Carlson,
By Spencer, Marzall, Johnston & Cook
Attys

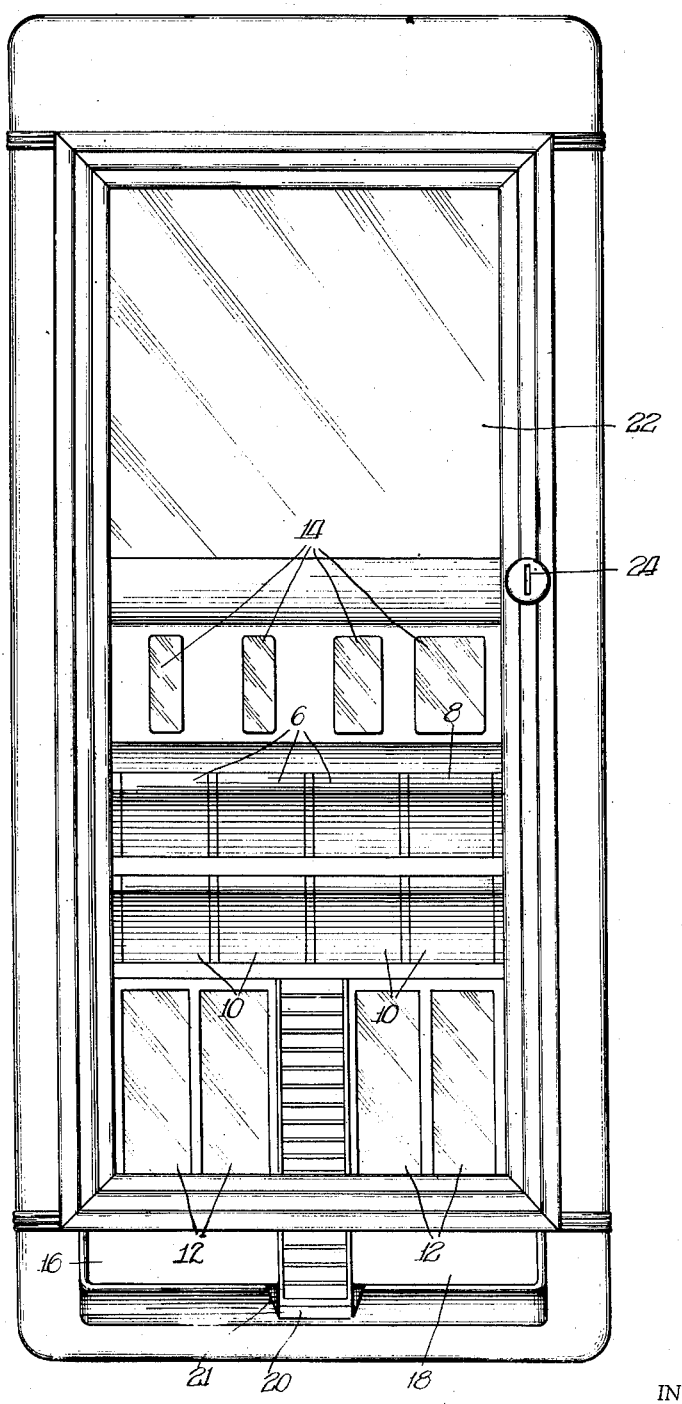

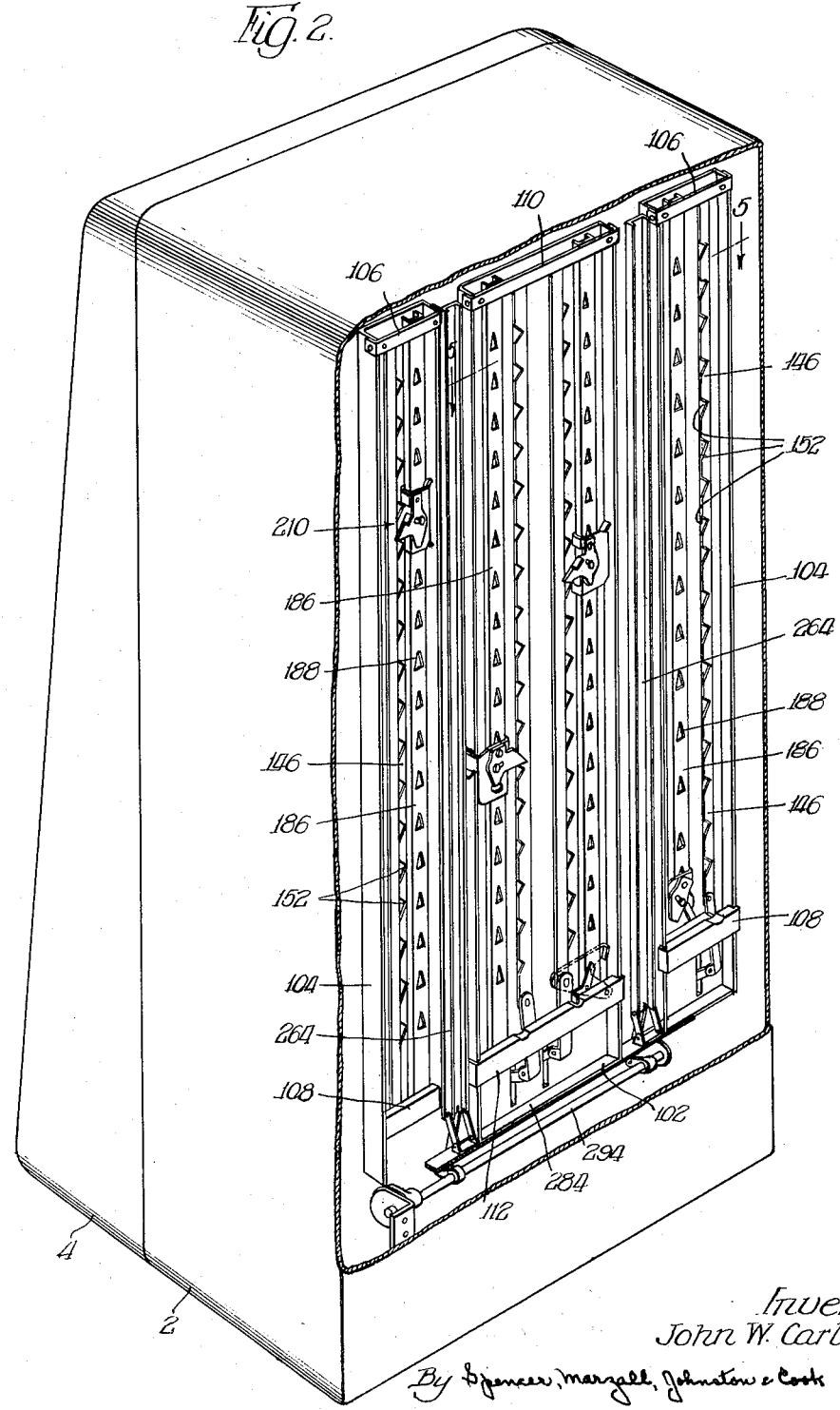

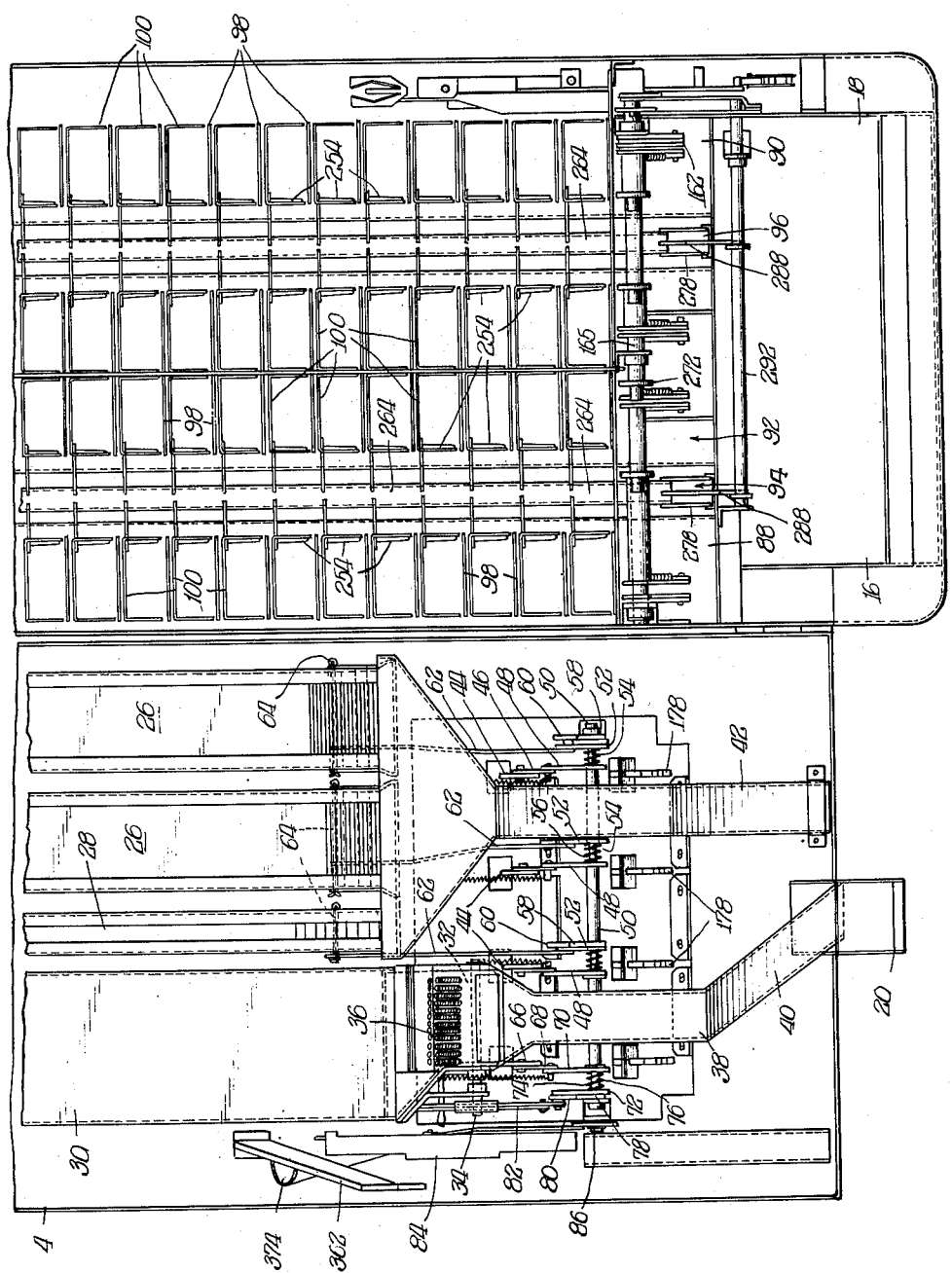

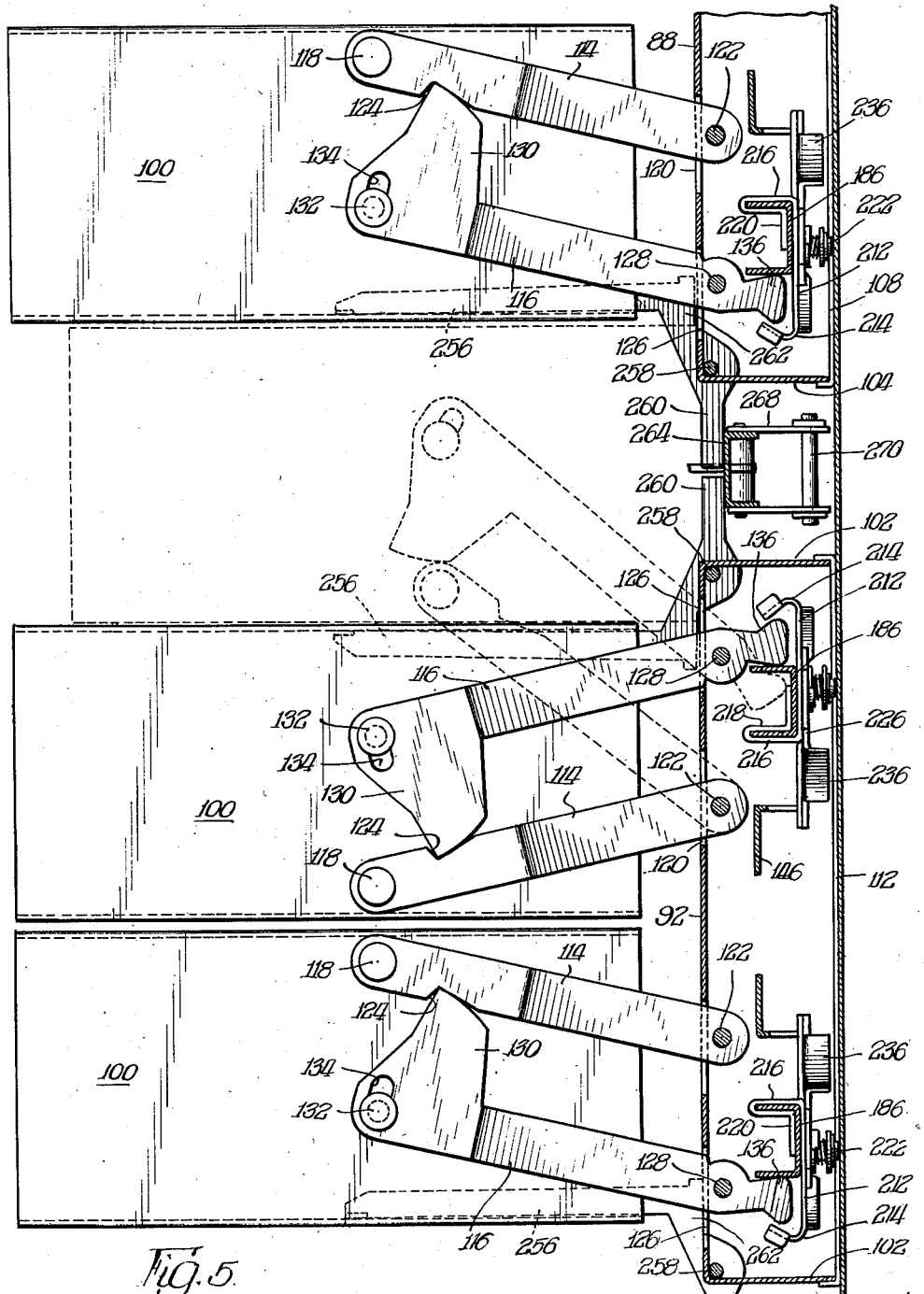

Feb. 27, 1951   J. W. CARLSON   2,543,687
VENDING MACHINE
Filed Jan. 23, 1943   11 Sheets-Sheet 6
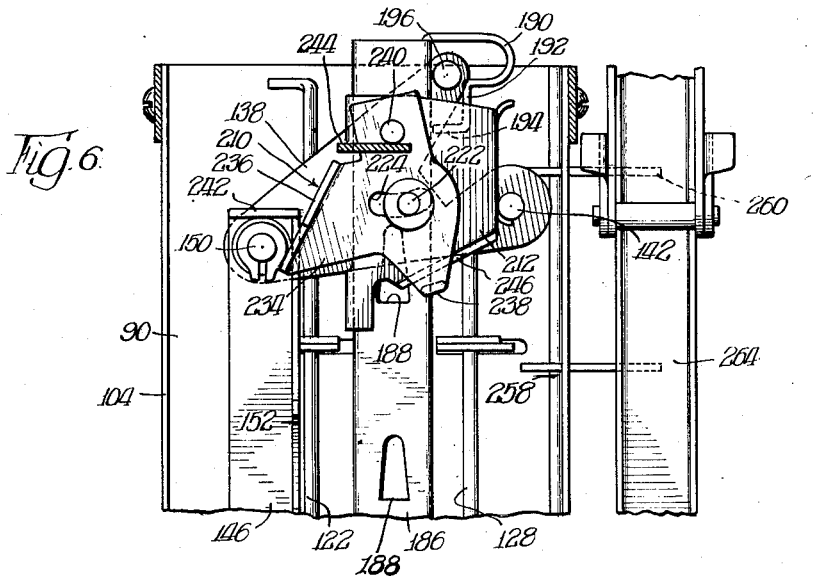
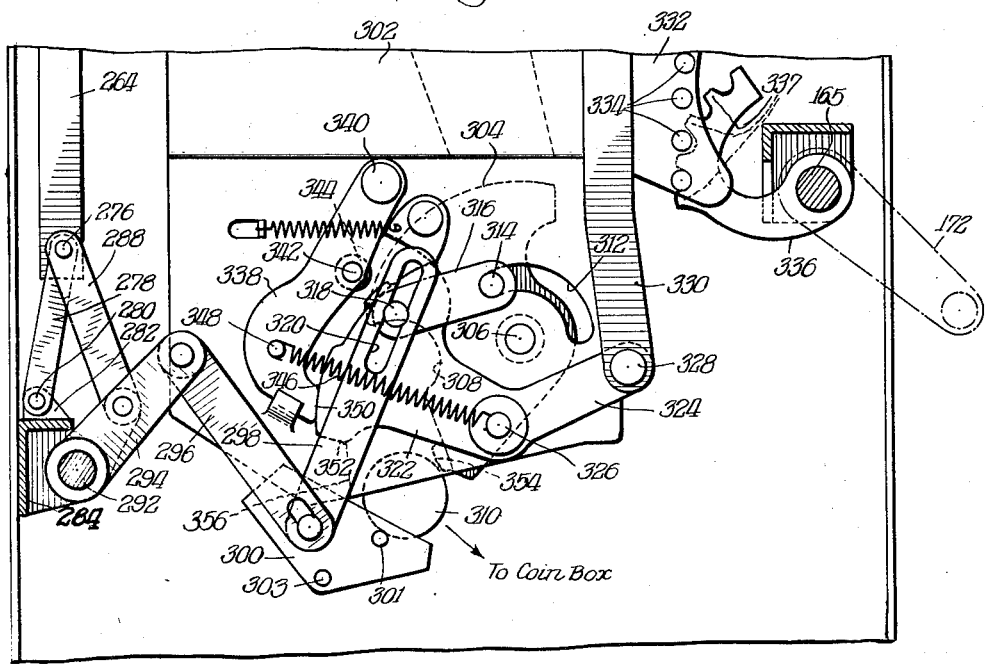
INVENTOR.
John W. Carlson,
BY Spencer, Marzall,
Johnston & Cook
Attys

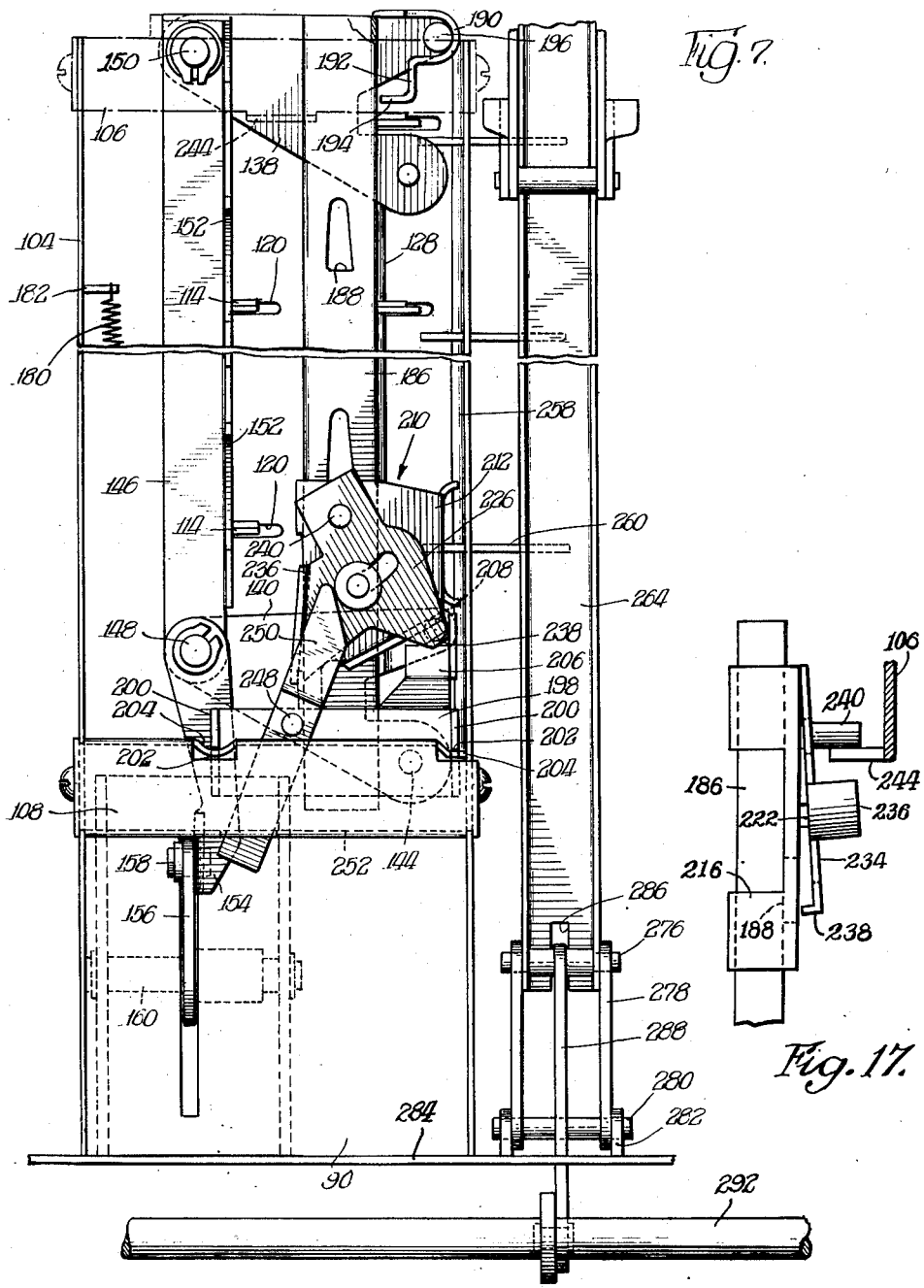

Feb. 27, 1951   J. W. CARLSON   2,543,687
VENDING MACHINE
Filed Jan. 23, 1943   11 Sheets-Sheet 8

INVENTOR.
John W Carlson
BY Spencer, Marzall,
Johnston & Cook

Feb. 27, 1951     J. W. CARLSON     2,543,687
VENDING MACHINE
Filed Jan. 23, 1943     11 Sheets-Sheet 9
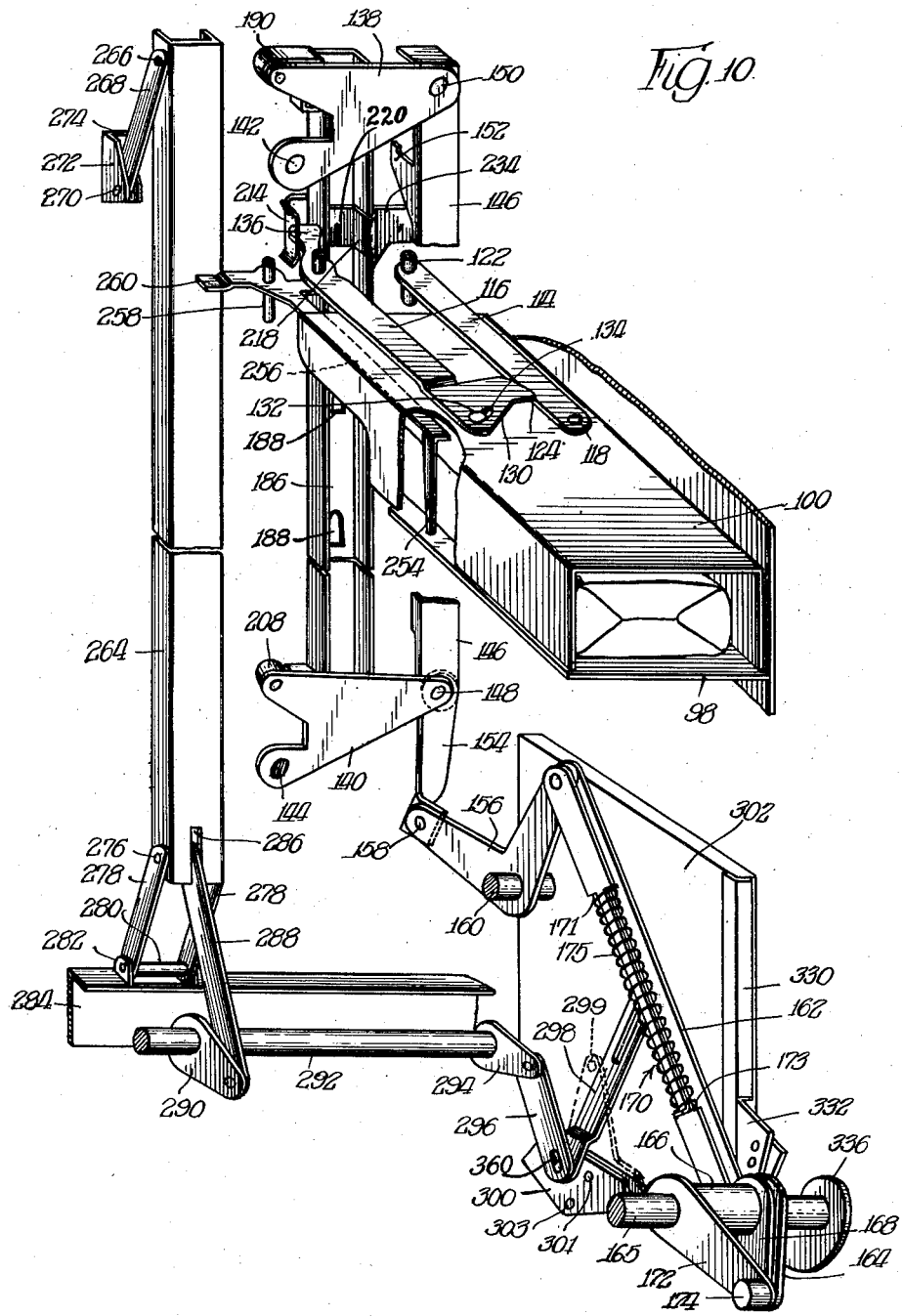
INVENTOR.
John W. Carlson,

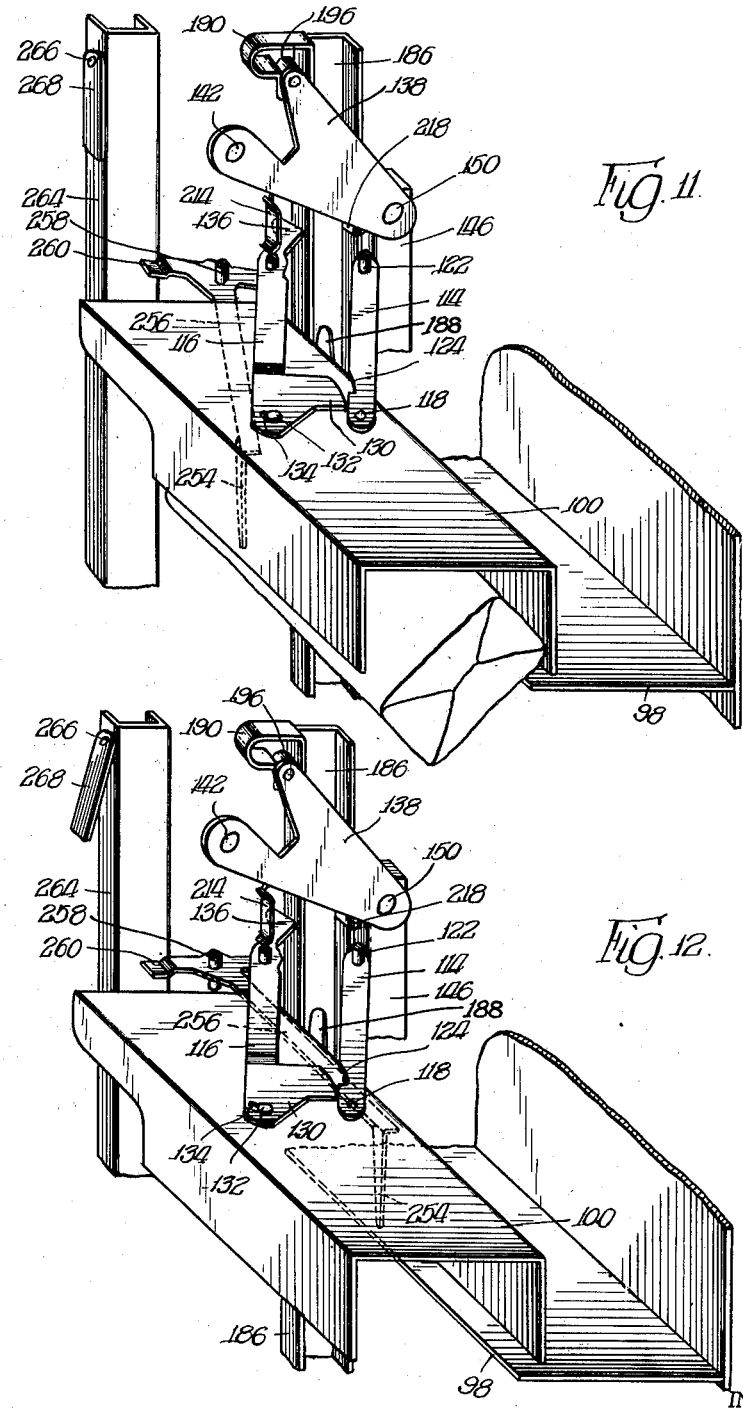

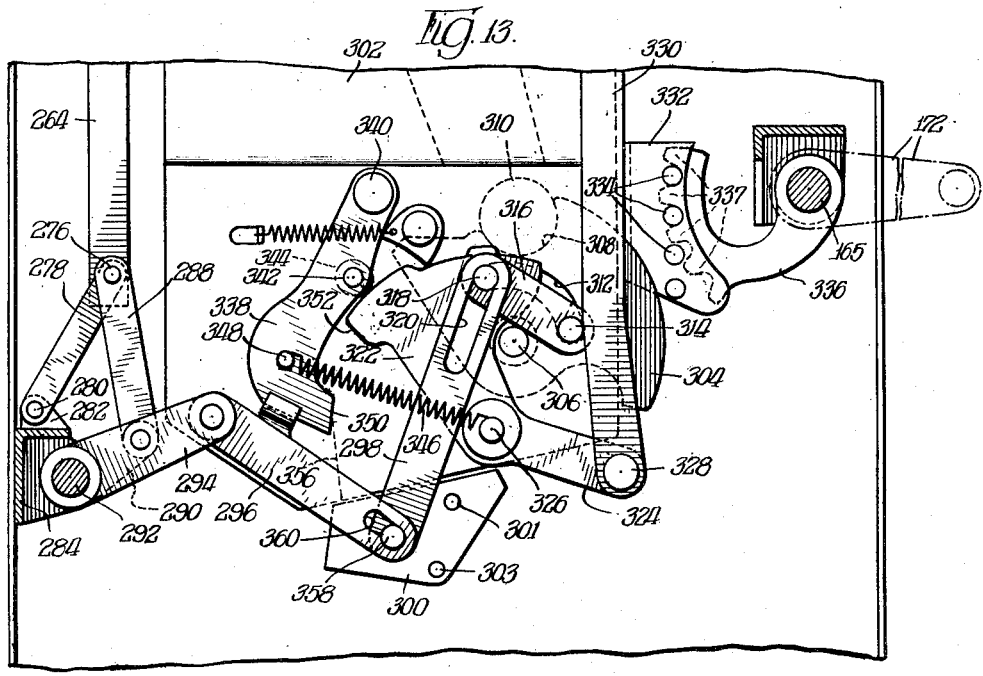
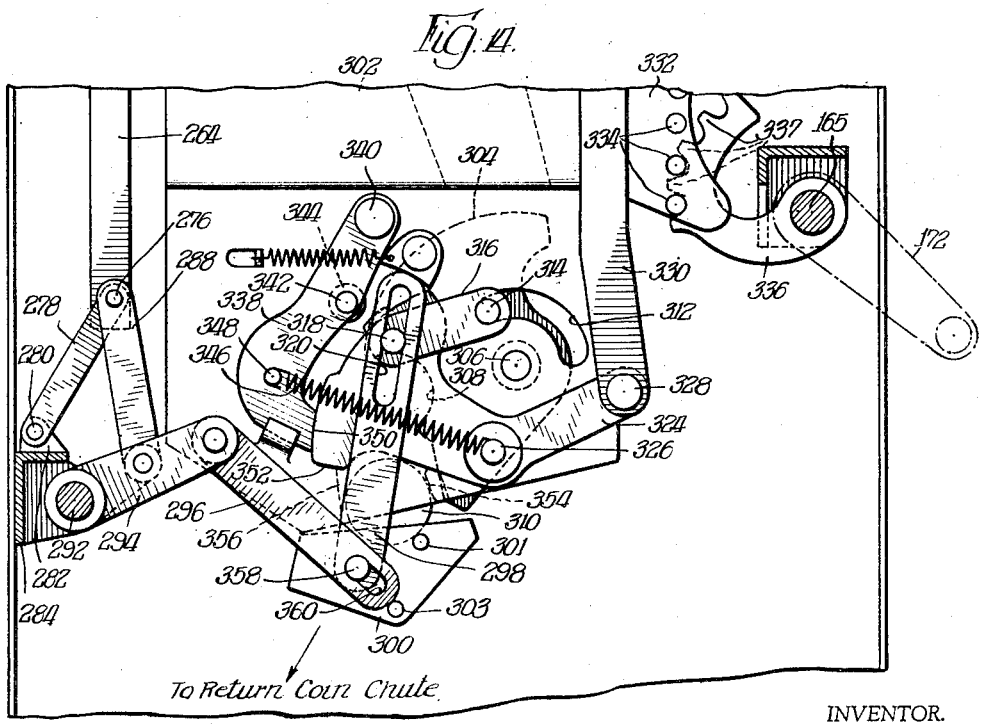

Patented Feb. 27, 1951

2,543,687

UNITED STATES PATENT OFFICE 2,543,687

VENDING MACHINE

John W. Carlson, Chicago, Ill., assignor to Automatic Canteen Company of America, Chicago, Ill., a corporation of Delaware Application January 23, 1943, Serial No. 473,356

13 Claims. (Cl. 312—93)

This invention relates in general to vending machines and particularly to a selective vending machine having a plurality of banks of magazines for vending both packaged and bulk merchandise.

One of the objects of this invention is to provide a vending machine capable of dispensing a variety of both packaged and bulk merchandise, such as candy, gum and nuts, all stored in an unusually compact manner in a single cabinet.

Another object of the invention is to provide a vending machine wherein some of the storage magazines are positioned within the cabinet and others on the inside of the door.

A further object of the invention is to provide a vending machine having a plurality of storage magazines and a control for each magazine mounted on the door and operable to deliver merchandise therefrom wherein a releasable connection is formed between the operating mechanism of the magazines within the cabinet and their respective controls, so that disconnection therebetween will be effected upon opening the door.

Still another object of the invention is to provide a vending machine having a single coin slot in a wall thereof and two coin mechanisms to receive coins of different denominations, one mounted on the door and the other within the cabinet so that, for example, upon depositing a nickel the delivery means of one bank of magazines may be operated, or upon depositing a penny the delivery means of another bank of magazines may be operated.

A still further object of the invention is to provide in a vending machine a storage magazine having a plurality of superposed fixed shelves or article supports, each provided with a delivery mechanism and combined with means to successively operate the delivery mechanisms upon depositing an acceptable coin and actuating the control associated therewith.

A further object of the invention is to provide in a vending machine a magazine consisting of a plurality of superposed fixed shelves or article supports, each provided with a delivery means which is normally in a locked position and which partially surrounds the article, so that it cannot be removed from the shelf by shaking the machine. In this connection there is also provided a mechanism whereby, upon initial movement of the control, the locking means will be released and, upon further movement thereof, delivery of the article will be effected.

Another object of the invention is to provide in a vending machine of this character a climbing monkey which is adapted to be advanced from shelf to shelf and operate successive delivery means upon each actuation of the control associated therewith, there being also means provided whereby the monkey, upon reaching the topmost shelf, will be automatically released and permitted to drop by gravity to the lowermost shelf.

Still another and more specific object of the invention is to provide in a vending machine of this character a monkey having a faceplate pivotally mounted on the body thereof, the body adapted to actuate the delivery means, and the faceplate holding it in each advanced position, combined with means at the top of the magazine to move the plate out of normal position and allow the monkey to drop to the bottom, and other means at the bottom to move the faceplate back to normal position, thus resetting it for another climb to the top.

A still further object of the invention is to provide an empty lock in association with each delivery means adapted to return a coin if there is no merchandise on the shelf where the particular delivery means is being operated but still permitting the delivery means to operate and advance the monkey to the next adjacent shelf.

Still another object of the invention is to provide means for releasably holding each magazine in position so that one can be easily removed by a serviceman and replaced by another magazine having a greater or lesser number of shelves therein. In this connection, it may be observed that all candy bars are not of the same thickness, therefore, the overall dimension of all of the magazines being the same, each may contain a different number of shelves, those containing a comparatively flat candy bar being provided with a greater number of shelves than those storing candy bars of greater thickness. The removability of these magazines is advantageous because the popularity of candy bars will vary depending on the location of the machine, and after the machine has been in use for some time it is possible to determine the popularity of the various candy bars and arrange to have more of these bars stored in the machine than others.

Other objects and advantages of the invention will be apparent by reference to the following description in conjunction with the accompanying drawings in which:

Fig. 1 is a front elevational view of the vending machine of my invention;

Fig. 2 is a perspective view of the machine from the rear with the rear panel removed and showing some of the mechanism therein;

Fig. 3 is a fragmentary front elevational view showing the lower part of the machine with the door opened and the various magazines located therein;

Fig. 4 is a vertical section through the machine from front to rear;

Fig. 5 is an enlarged fragmentary horizontal section taken substantially along the plane of line 5—5 in Fig. 2 showing some of the delivery means and locking mechanism therefor in plan and other mechanism associated therewith in section;

Fig. 6 is an enlarged fragmentary rear elevation of the upper part of a single magazine showing the monkey operating the topmost delivery means and in the process of being released for its movement downwardly to the bottom of the magazine;

Fig. 7 is a fragmentary rear elevational view of a single magazine showing the operating mechanism in its normal position immediately after the monkey has dropped to the bottom.

Fig. 10 is a fragmentary perspective view showing the mechanism of a single article support and its delivery means, together with the position of the empty lock and the releasable lock of the delivery means, all in normal position;

Fig. 11 is a fragmentary view similar to Fig. 10 but showing the position of the various elements upon delivering an article, such as candy bars, to the delivery chute;

Fig. 12 is a fragmentary perspective view of the mechanism shown in Fig. 11 showing particularly the position of the testing finger of the empty lock either after the delivery of a candy bar or when there has been no candy bar present on the shelf;

Fig. 13 is a fragmentary side elevation of the lower part of the coin mechanism used in connection with the candy bar magazines, and the empty lock adaptor mechanism connected therewith showing the position of a coin therein before actuation;

Figure 8:
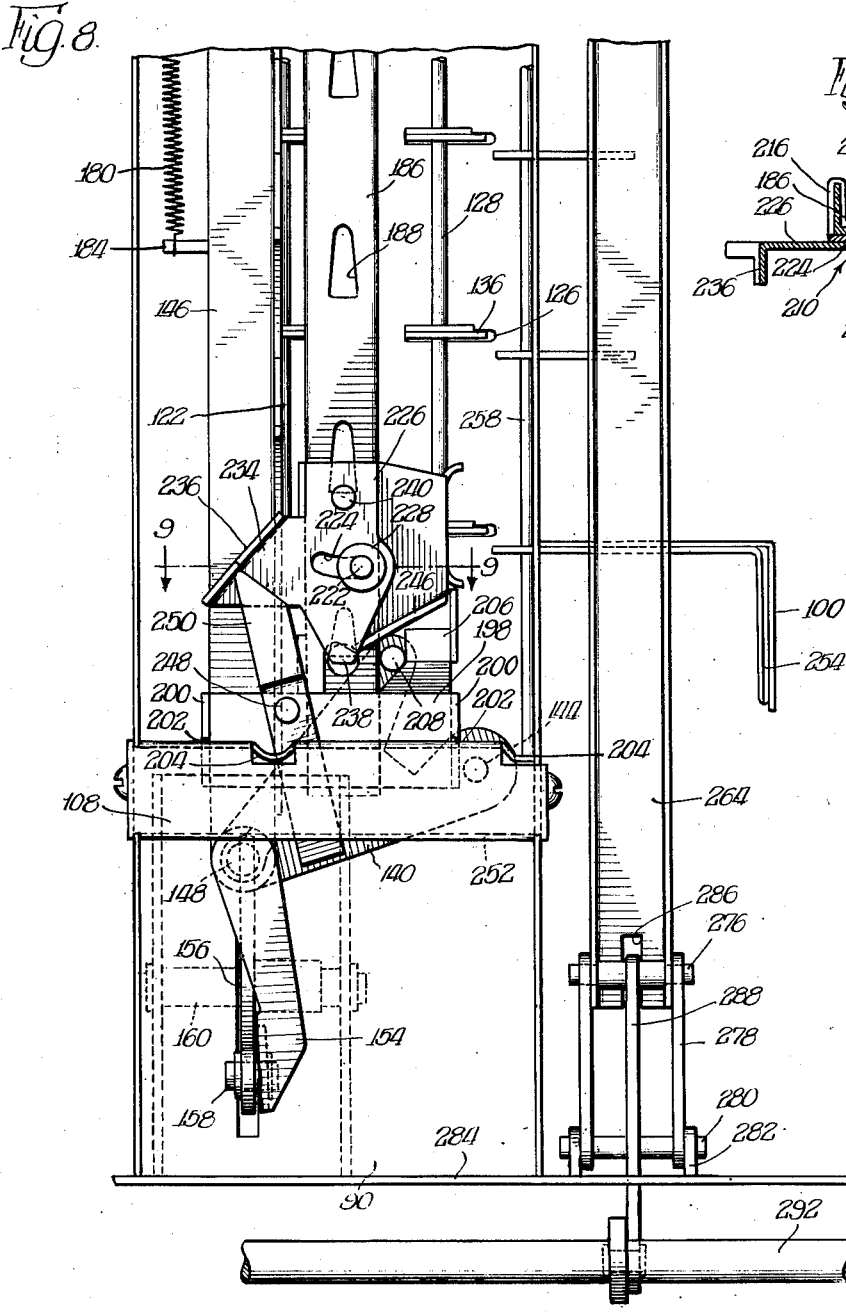
Fig. 8 is a fragmentary rear elevation of a single magazine showing the position of the various parts upon actuation of the lowermost delivery means and the faceplate of the monkey being returned to its normal position.

Fig. 14 is similar to Fig. 13 and shows the position of a coin and other parts of the coin mechanism after actuation thereof and showing the empty lock adaptor mechanism still in normal position, indicating the absence of a candy bar on the shelf where the particular delivery means was operated; and Fig. 15 is a view similar to Fig. 14 showing the actuated position of the coin mechanism and the empty lock adaptor mechanism, indicating the presence of a candy bar on the shelf of the particular delivery means being operated.

Fig. 16 is a fragmentary perspective view of the coin chute showing the means for directing coins of one denomination to one coin mechanism and those of another denomination to the other coin mechanism.

Fig. 17 is a somewhat enlarged side elevation of the monkey substantially in its position as shown in Fig. 6.

My invention is concerned chiefly with the novel mechanism which operates the delivery means for each shelf of the magazines positioned within the cabinet and particularly adapted to dispense candy bars. However, the arrangement of the various magazines is equally important and permits the storage of an unusually great variety of merchandise in a comparatively small space.

In the preferred embodiment of the invention as shown in the drawings the magazines for storing and dispensing candy bars are located within the cabinet, while on the inside of the door storage magazines for gum and nuts are mounted. While this particular arrangement is believed to be novel, the actual operating mechanism of the gum magazines and the coin mechanism used in connection therewith are disclosed in the patent to Gallagher et al. No. 2,251,994. The nut storage magazine mounted also on the inside of the door adjacent the gum magazines is also conventional and is provided with the usual rotating drum at the bottom thereof having recesses therein adapted to dispense a measured quantity of nuts. Each magazine has its own control associated therewith and located in the door.

Since operation of the gum and nut magazines usually necessitates the use of a penny and operation of the candy magazines necessitates the use of a nickel, I provide two coin mechanisms, one adapted to receive a penny mounted on the inside of the door, and the other adapted to receive a nickel mounted within the cabinet. I also provide a single coin slot in the door adapted to receive both types of coins and pass them through a separating device which directs the nickels to the coin mechanism within the cabinet and the pennies to the coin mechanism on the inside of the door.

Upon each actuation of an external control associated with a candy magazine a delivery means is operated by means of the monkey adjacent thereto and, upon the return movement of the delivery means, the monkey is advanced to the next adjacent shelf, thereby causing successive operation of the delivery means in a particular magazine. This advancement of the monkey will occur regardless of the presence or absence of a candy bar on the shelf where the delivery means is being operated. The advantage of such an arrangement is that a patron's coin will be returned if a delivery means is actuated in the absence of a candy bar, after which he may redeposit the coin and again actuate the control, causing the next successive delivery means to be operated. It occasionally happens that a serviceman when refilling the candy compartments may fail to load one and in machines of this character heretofore known if this occurs the coil will still be deposited in the coin box and the patron will receive nothing. The presence of a candy bar will cause the empty lock to direct the coin to the coin box, whereas the absence thereof will prevent any movement of the empty lock mechanism and thereby direct the coin to the return coin chute.

After the monkey has actuated the topmost delivery means it immediately returns automatically to the bottom of the magazine and is reset for its step by step advancement to the top. This insures the dispensing of the fresh candy last and for this reason has marked advantages over similar vending machines wherein each time the serviceman reloads he must reset the monkey at the bottom. When this occurs, he must either remove the remaining bars from the uppermost compartments and replace them in the bottom of the magazine or permit them to remain, in which case they may become stale.

Referring now more particularly to the drawings, and especially to Fig. 1, the machine consists of a main cabinet portion 2 and a door 4 pivotally mounted thereon and within which one of the banks of magazines is mounted. In the embodiment of the invention shown there are eight separate magazines requiring eight separate external controls. These controls are in the form of push keys and are slidably mounted in the door. As shown in Fig. 1 there are provided two rows of four controls each and in the preferred form the upper row is adapted to dispense merchandise from the magazines mounted on the inside of the door, while the lower row is connected with the delivery means of the magazines mounted within the cabinet proper. In the upper row of controls those indicated by the numeral 6 are connected with the gum magazines and that indicated by the numeral 8 is connected with the nut magazine. The controls in the lower row, indicated by the numeral 10, are connected with the candy magazines within the cabinet.

I also provide suitable display compartments on the door having transparent coverings thereover so that a patron may see a sample of the merchandise he is about to purchase. Below the lower row of controls I provide a series of display compartments 12 especially designed to display samples of candy bars, one compartment below each control, indicating that operation of that particular control will dispense a candy bar corresponding to the sample displayed in the compartment therebelow. Above the upper row of controls there is also provided a series of display compartments 14, the three smaller ones at the left adapted to display various flavors of gum and the one at the right adapted to display nuts. Here again the operation of a selected control will dispense the merchandise displayed immediately thereabove.

At the bottom of the machine, delivery chutes 16 and 18 are disposed where the patron may receive gum or candy, and between these two chutes is located a smaller delivery chute 20 having a pivotally mounted door 21 covering the opening therein. This chute is adapted to deliver a measured quantity of nuts. The upper part of the door 4 may be provided with any suitable advertising matter or may be mirrored, as shown at 22. A single coin slot 24 is also disposed in the door 4 adapted to receive coins of various denominations in order to permit operation of selected controls.

Referring now particularly to Fig. 3, it will be observed that the gum magazines 26 and 28, as well as the nut magazine 30, are all disposed on the inside of the door in alignment with each other. The two magazines indicated by the numeral 26 are particularly adapted to store and dispense gum sticks, while the magazine 28 is especially adapted to store and dispense gum pellets.

The operation of these various magazines will be described just briefly since the operating mechanisms thereof do not form a part of this invention per se. The mechanism of the nut magazine is conventional and includes a rotatable cylinder 32 having opposed recesses therein, one of which is open to the bottom of the magazine 30 and into which a measured quantity of nuts may drop by gravity. This cylinder is rotatably mounted upon a shaft 34 and is adapted to be rotated past a series of coiled springs 36 which prevent the nuts from being crushed. As the cylinder 32 rotates it delivers a quantity of nuts into the delivery chute 38 which has an additioned portion 40 connected thereto leading to the chute 20. After the nuts have reached their destination, the door 21 may be lifted and the nuts removed.

Connected with each of the gum magazines 26 and 28 is a suitable dispensing mechanism which delivers either a gum stick or a gum pellet into the delivery chute 42 which directs the merchandise into the delivery chute 16.

Briefly describing the mechanism which causes delivery of the gum and which is adequately described in the aforementioned patent to Gallagher et al. No. 2,251,994, it will be noted that each of the external controls 6 is provided with an inwardly extending portion 44, each of which has a link 46 pivotally connecting it with another link 48 loosely mounted on a shaft 50 which is mounted for rotation on the inside of the door and extends horizontally thereacross. An upwardly extending arm 52, also loosely mounted on the shaft, is spaced from each of the links 48. Each arm 52 and link 48 is provided with interlocking fingers 54 so that upon operation of a control causing rotary movement of a link 48 a similar rotary movement will be imparted to the corresponding arm 52. A coiled spring 56 surrounds the shaft 50 between each link 48 and arm 52 so that after a downward stroke of the control it will be returned upwardly to its normal position.

Also spaced along the shaft adjacent each arm 52 is an upwardly extending finger 58. It is to be noted, however, that this finger 58 in each case is rigidly secured to the shaft 50. Immediately above each finger 58 a member 60 is secured to the upper part of each arm 52. The member 60 in each case is disposed in the path of a finger 58 so that upon actuation of any selected control causing a rotation of a link 48 and its corresponding arm 52 a downward movement of a member 60 will be caused which will bear against a finger 58 thereby causing a rotation of the shaft 50. It is to be noted that actuation of any single control will rotate the shaft 50 but will not effect movement of any of the other controls, since they are loosely mounted on the shaft.

Each arm 52 is also pivotally connected at its upper end to an upwardly extending elongated link 62, the upper end of which is secured to a dispensing frame mounted to pivot about a pin 64. The operation and function of this dispensing frame is similar to that shown and described in the above-mentioned Gallagher patent and it is merely sufficient to state here that it is of such character as to remove from the bottom of a stack of gum sticks or gum pellets the lowermost article and deposit it in the delivery chute 42, this action taking place due to the pivotal movement of the delivery means about the pin 64 caused by rotation of an arm 52 inducing a reciprocating movement to one of the links 62.

The basic operation of the nut delivery means is substantially the same as that just described; however, the differences are sufficient to warrant a separate description. Here the control identified by the numeral 8 is provided at its lower end with an inwardly extending member 66 which has a link 68 connecting it with another link 70 loosely mounted on the shaft 50, an arm 72, is also loosely mounted on the shaft 50 in spaced relation to the link 70, between which are disposed the same interlocking fingers 74 and a coil spring 76 to aid in maintaining the control in its normal position. Adjacent the arm 72 and rigidly secured to the shaft 50 is an upwardly extending finger 78 in the path of which is located a movable member 80 secured to the upper end of the arm 72. It will therefore be evident that a downward movement of the control 8, causing a rotary movement of the link 70 and arm 72, will cause a movement of the member 80 against the finger 78, thereby inducing a rotary movement of the shaft 50.

An upwardly extending rack 82 is pivotally secured at its lower end to the upper end of the arm 72 and is mounted for reciprocating movement. A pinion 83 (Fig. 4) is adapted to be enmeshed with the rack 82 and is secured to the shaft 34, whereby a rotary movement of the link 70 and arm 72 will cause a downward movement of the rack 82 and a corresponding rotary movement to the shaft 34 and the drum 32 mounted thereon. Suitable means are provided to disengage the rack and pinion on the upward movement of the rack so that after it reaches its normal upper position it will then be ready to cause a successive rotation of the drum 32 upon a subsequent operation of the control 8.

The above description as to the operation of the delivery means for gum and nuts has been given with the assumption that an acceptable coin had been deposited in the coin slot 24. Upon depositing such a coin it will be directed to the coin mechanism 84 also mounted on the inside of the door. One end of the shaft 50 is keyed to a rotatable link 86, which in turn is suitably secured to a rotatable member in the coin mechanism which normally has a limited movement. Thus, upon actuation of either of the controls 6 or 8 without having first deposited a suitable coin, the shaft 50 will be rotated only a limited distance and prevent actuation of any of the dispensing or delivery means. If, however, a suitable coin has been deposited, the member to which a link 86 is connected will be permitted to have a full, free movement, the presence of the coin acting to remove the stop means from the path thereof, whereupon a complete stroke of a selected control may take place for causing the delivery of selected merchandise. The details of the coin mechanism 84 form no part of the present invention and therefore need not be described in detail here, the operation thereof being more clearly described in the aforementioned patent to Gallagher et al.

The construction and operation of the second or inner bank of magazines particularly adapted to dispense candy bars will now be described. In this connection it should be observed that there are four separate magazines, those at each side of the machine being mounted upon supporting plates indicated respectively by the numerals 88 and 90. Each constitutes a separate removable magazine; whereas the two magazines at the center of the machine are mounted upon a single support 92. Either of the magazines mounted on plates 88 or 90 may be separately removed, either for repairs or replacement purposes but a removal of the supporting member 92 in the center of the machine will simultaneously remove both of the center magazines. The arrangement of these various magazines is such that a common delivery chute is provided between each pair; that is to say, the space between the magazine mounted on a support 88 and the left-hand magazine on the support 92 constitutes a delivery chute 94 for delivering candy into the chute 16, and the space between the magazine on support 90 and the right-hand magazine of the support 92 constitutes a delivery chute 96 for dispensing candy into the chute 18. Each magazine is composed of a plurality of superposed article supports and the delivery means associated with each one operates in such a way as to move the article off of the shelf sideways into its respective delivery chute.

The article supports or shelves in each magazine are identified in the various figures in the drawings by the numeral 98 and each is provided with a delivery means which, in the preferred embodiment of the invention, comprises a hood 100 having a top with downward turned sides whereby it partially surrounds the article on the shelf. One of the novel features of this invention resides in the manner of moving each delivery means sideways so that it will carry with it the article which it partially surrounds and deposit the article through the open underside thereof into the proper delivery chute. As stated heretofore, the magazines are mounted upon supporting plates 88, 90 and 92. The central plate 92 is provided with rearwardly extending flanges 102 at each side thereof, whereas the supporting plates 88 and 90 have rearwardly extending flanges 104. These may be clearly seen, particularly in Figs. 2 and 5. Each supporting plate 88 and 90 is also provided at its upper end with a transversely extending bracket 106 and at its lower end with a similar bracket 108, while the central support has similar upper and lower brackets 110 and 112 (see Figs. 2 and 7).

Referring now more particularly to Figs. 5, 10, 11, and 12, it will be observed that the mechanism by which each hood or delivery means 100 is moved laterally consists of a pair of parallel links 114 and 116 pivotally secured to the top of each delivery means. The link 114 is pivotally secured at one end thereof by means of the pivot pin 118 to the top of the delivery means, and its rear end extends through a slot 120 in the adjacent supporting plate and is mounted for free pivotal movement on a vertically extending pivot rod 122. This rod extends throughout the entire length of the magazine in each case and pivotally supports each of the links 114 in spaced apart relation throughout substantially its entire length.

In one edge of the link 114 there is provided a notch 124, the purpose of which will be apparent hereinafter. The link 116 also extends rearwardly through a slot 126 in the adjacent supporting plate and is mounted for free pivotal movement on a vertically extending pivot rod 128. This rod is similar to rod 122, referred to above, and supports the links 116 in spaced apart relation throughout substantially its entire length. The forward end of the link 116 is provided with a lateral extension 130 which is adapted to be received in the notch 124 of the link 114 in the normal position of the various parts and when the delivery means is at its normal unactuated position. A pin 132 extends upwardly from the top of each delivery means and is received in a slot 134 in the forward end of the link 116. This link also is provided with an extension 136 on its inner end which may be actuated by means described hereinafter for operating the delivery means.

It will be obvious that in the normal position of the parallel links 114 and 116, where the edge of the extension 130 is located in the notch 124, the delivery means 100 will be locked against movement, it being necessary to release the locking means by removing the extension 130 from the notch 124 before any lateral movement of the delivery means can take place. For the present it is sufficient to state that when one of the candy magazine controls is actuated initial movement of the link 116 takes place until the pin 132 bears against the opposite end of the slot 134. When the link 116 has been moved this distance, the edge of the extension 130 will have been removed from the notch 124, thereby releasing the locking means and permitting further movement of both links. It will be obvious then that further pivotal movement of the link 116 will carry with it the delivery means and the link 114, thereby insuring a substantially parallel sideways movement of the delivery means 100. The completely actuated position of the links 114 and 116 and the delivery means 100 is shown in dotted lines in Fig. 5. When the delivery means has moved to this position, any article present on the shelf immediately therebelow will have been carried with the delivery means to a point beyond the shelf, after which it will drop by gravity into the delivery chute and be delivered into one of the chutes 16 or 18.

The mechanism by which the delivery means is actuated will now be described and the various parts of the mechanism may be more clearly seen in Figs. 6 to 12, inclusive. Referring for the present particularly to Figs. 7 and 10, there are provided two substantially triangular shaped links, each pivotally secured to a magazine support, the particular one shown in these figures being the magazine at the extreme right-hand side of Fig. 3, which is mounted on the support 90. All of the magazines function in the same way, so that a description of one will suffice for all. The upper link is indicated by the numeral 138 and is positioned adjacent the upper end of the supporting plate, while the other link is identified by the numeral 140 and is positioned adjacent the lower end thereof. The upper link 138 is pivotally mounted at 142 to the plate, and the lower link 140 is pivotally mounted in a similar manner to the plate as at 144. A substantially vertical ratchet bar 146 is located adjacent these links and is mounted for substantially vertical reciprocation. A pivot pin 148 secures one end or corner of the triangular link 140 to the bar 146 near the bottom thereof, while a similar pivotal connection at 150 is effected between the upper ling 138 and the upper end of the bar 146. One edge of this vertical bar is provided with a plurality of vertically spaced apart stop members 152, each of which is substantially triangular shaped having an upper horizontal edge and a lower rearwardly and downwardly inclined edge as more clearly shown in Figs. 2 and 10. It will be obvious that a downward movement of the bar 146 will cause each of the links 138 and 140 to pivot about their respective pivotal points 142 and 144.

Reciprocation of this bar is effected by means of a linkage mechanism clearly shown in Figs. 4, 7 and 10 wherein it will be seen that the bar 146 is provided with a lower extension 154 which is pivotally secured to one arm of a bell crank lever 156 at 158, which lever is mounted for rotative movement on a stub shaft 160. The other arm of the bell crank lever 156 is connected by means of a link 162 to an arm 164 secured to a shaft 165 which extends substantially across the full width of the machine within the cabinet and at the lower part thereof. Immediately adjacent the arm 164, a sleeve 166 is mounted for free rotative movement on the shaft 165. One end of the sleeve 166 has secured thereto or integral therewith an arm 168 which is similar to and closely adjacent the arm 164. The arm 168 is also connected to the forwardly extending arm of the bell crank lever 156 by means of a link 170. This link, however, is formed of two parts slidably engaged as shown. One part has a shoulder 171 and the other part a shoulder 173 between which is located a coiled compression spring 175 to permit continued movement of an external control beyond a predetermined point, to prevent breakage, as will be explained more fully hereinafter. The other end of the sleeve 166 has secured thereto or integral therewith a forwardly extending arm 172, the forward end of which is provided with a laterally extending pin 174 adapted to be received in a slot 176 in an extension 178 of a control 10.

The operation of this mechanism may be briefly described as follows. A downward movement of one of the controls 10 will cause a clockwise rotation of the arm 172 as viewed in Figs. 4 and 10, which in turn causes a similar rotation of the arm 168 and moves the bell crank lever 156 in a counterclockwise direction, thus moving the ratchet bar 146 downwardly. It may be noted at this point that upward and rearward movement of the link 170, which causes a counterclockwise rotation of the bell crank lever 156, will carry with it a similar movement of the link 162 and a clockwise rotation of the arm 164. This latter arm being secured to the shaft 165 will, therefore, impart thereto a rotary movement also in a clockwise direction. The bar 146 and its connected parts are aided in their return upward movement by means of a coiled spring 180 (Figs. 7 and 8) which has its upper end connected to an inwardly extending member 182 secured to the supporting plate and its lower end connected to a similar member 184 secured to the bar 146.

Still referring to Figs. 6 to 12, inclusive, a second vertically extending bar or channel member 186 is mounted adjacent the bar 146, which member, however, is mounted for lateral reciprocation rather than vertical as in the case of the bar 146. The channel member 186 is provided with a plurality of vertically spaced apart openings 188 which act as stop members to prevent downward movement of the actuating means or monkey, as will be presently observed. The upper end of the channel 186 is provided with a laterally extending loop or strap 190 which is curved at its outer end and returned for a short distance, after which it extends downwardly as at 192 parallel to the channel member and terminates in an inwardly extending portion 194 (see Figs. 6 and 7). The third corner of the upper triangular link 138 is provided with a rearwardly extending pin 196 adapted to be received within the confines of the strap 190. As viewed in Fig. 7, this strap provides a substantially right-angled slot within which the pin 196 may ride, so that upon downward movement of the bar 146, causing a counterclockwise rotation of the link 138 about its pivot point 142, the pin 196 will be moved toward the left until it contacts one leg of the channel 186 (see Fig. 6). Further rotative movement of the link will then tend to move the channel 186 toward the left as in Fig. 8.

The lower end of the channel member 186 is secured to a transversely extending member 198 (Figs. 7 and 8); each end of this member is rearwardly flanged, as at 200, and is provided with a slot 202 in each flange. Each slot is adapted to receive the upper flange of the bracket 108 which is provided with a pair of spaced apart depressed portions 204. One end of the member 198 is provided with an upwardly extending finger 206 on which a pin 208 located in the third corner of the triangular link 140 normally rests. Thus far then it will be clear that a downward movement of the bar 146 will cause a counter-clockwise rotation of each of the links 138 and 140, thereby moving the respective pins 196 and 208 toward the left, from the position shown in Fig. 7, until they contact one edge of the channel 186 as in Fig. 6. Further movement downwardly of the bar 146 will cause lateral movement of the channel 186 toward the left to the position shown in Fig. 8, in accordance with a corresponding movement of the pins 196 and 208. The upper pin 196 will then move downwardly into the vertical portion of the slot and the lower pin 208 will likewise be moved downwardly into the space between the finger 206 and the adjacent edge of the bar 186. It is, therefore, evident that a vertical reciprocation of the bar 146 will cause a lateral reciprocation of the channel member 186.

The means which causes successive operation of the delivery means of any one magazine, commonly called a monkey, will now be described and is identified in the drawings generally by the numeral 210. The monkey is more clearly shown in Figs. 6, 7, 8 and 9. Referring more particularly to Fig. 9, the body of the monkey is identified by the numeral 212 and is provided at one side thereof with a loop or inwardly bent portion 214. The opposite side of the body is forwardly flanged as at 216 for a distance substantially equal to the width of a leg on the channel 186. There is then provided a return bent portion 218 passing along the inner side of said leg on the member 186 and terminating in a portion 220 parallel to the main body portion 212. This arrangement permits a sliding movement of the monkey vertically along the channel member 186. A pin 222 extends rearwardly from the body 212 and is received in a slot 224 located in a face plate 226 pivotally mounted on the body member 212. Near the outer end of the pin 222 a collar 228 is secured, while a second collar 230 is freely mounted also on the pin in spaced relation to the collar 228, which collars are separated by a small compression spring 232 surrounding the pin and thereby yieldably holding the face plate 226 against the body member 212. The slot 224 is sufficiently large, and the pin 222 is long enough, to permit outward rocking of the face plate 226.

The face plate 226 is provided with a lateral extension 234 extending outwardly from one side thereof, which extension is in turn provided with a rearwardly extending inclined flange 236 providing this extension with an inclined edge. The lower portion of the face plate 226 is provided with a substantially triangular shaped extension, the lower end of which at 238 is curved slightly toward the web of the channel member 186. The face plate is then pivotally mounted on the body member by means of the pivot pin 240 which, as will be seen later, not only permits a rotative movement of the face plate and has sufficient clearance to allow an outward rocking movement thereof but also acts to prevent downward movement of the monkey in its uppermost position until after the two members 146 and 186 have returned substantially to their normal position.

Figure 9:
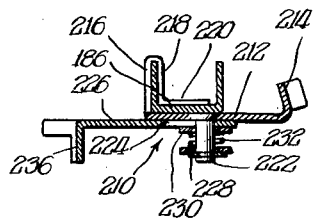
Fig. 9 is a horizontal section taken substantially along the plane of line 9—9 in Fig. 8 showing particularly the construction of the monkey and the manner in which the faceplate is yieldably held thereagainst.

The manner in which this monkey or actuating means operates the delivery means may best be understood by viewing Figs. 5, 10, 11 and 12, and the manner in which the monkey is advanced after the completion of each operation in order that the delivery means can be operated successively may best be understood by viewing Figs. 6, 7, and 8.

Considering first Figs. 5, 10, 11 and 12, it is to be noted that in each case the monkey is so located that the curved end 214 of the body portion partially surrounds the rearmost end or extension 136 of a link 116 of a particular delivery means. Initial downward movement of the bar 146, as explained hereinbefore, will cause a lateral movement of the channel member 186 on which the monkey is slidably mounted. The monkey is held in each position by reason of the fact that its lower inturned edge 238 is received in one of the openings 188 and rests on the lower edge thereof. Lateral movement of the member 186 will carry with it the monkey and, since the rearward extension 136 is in the path of the curved end 214 of the main body portion of the monkey, lateral movement thereof will impart a rotative movement of one of the links 116. It has been noted that initial rotary movement of the link 116 will release the locking mechanism and, as the member 186 continues to move laterally, the links 116 and 114 will continue to rotate and when the member 186 has completed its lateral movement in one direction, the particular delivery means will have been moved to the position shown in dotted lines in Fig. 5 and in full lines in Figs. 11 and 12. In this position any article on the shelf immediately below the actuated delivery means will have been swept off of the shelf and deposited in the delivery chute. Return of the control and members 146 and 186 to normal position will likewise return the delivery means.

Referring now more particularly to Figs. 6, 7 and 8, it will be observed that during the lateral movement of the member 186 the monkey has been held against downward movement by reason of its inturned lower edge 238 resting on the lower edge of an opening 188. During this time the bar 146 has been moved downwardly and one of the stop members 152 has passed below the lateral extension 234 of the face plate 226. The fact that the face plate is yieldably held against the main body portion by means of the spring 232 has permitted the stop member to cam the face plate outwardly in order that it may pass to a position therebelow. This movement of the face plate is a rocking motion wherein the right-hand edge thereof bears against the body portion. The inturned edge 238 is sufficiently close to the right-hand edge that its movement outwardly is comparatively slight and is not enough to completely remove it from the opening 188. On the return upward movement of the bar 146, after the monkey has operated a particular delivery means, the particular stop means 152 which has just passed below the extension 234 will bear upwardly against the lower edge thereof and carry the monkey upwardly to a point where the lower inturned edge 238 thereof will be received in the next successive opening 188. This movement is made possible because of the substantially triangular shape of each opening 188. Normally the inturned edge 238 rests on the lower and wider edge of an opening 188. The sides of each opening converge upwardly, so that as a stop member 152 moves the monkey upwardly, the converging sides of the opening will have a camming effect on the inturned edge 238, moving it gradually outwardly until, by the time it reaches the top of the opening, it will be clear thereof and free to drop into the next opening above. Also, during this upward movement of the bar 146, the two links 138 and 140 will rotate in a clockwise direction (Figs. 6, 7 and 8), moving the upper pin 196 so that it will bear first against the part 192 of the strap 190 and then against the inner side of the loop. At the same time the lower pin 208 will bear forcibly against the inner edge of the finger 206, thus returning the channel member 186 to its normal position. This operation takes place each time the external control is actuated until the monkey reaches the top and has operated the topmost delivery means.

As has been mentioned heretofore, I provide novel mechanism in connection with the monkey so that it is unnecessary to reset it manually after operation of the topmost delivery means. As soon as the topmost delivery means has been operated and returned to its normal position, the monkey immediately drops to the bottom by gravity and is automatically reset for another climb to the top. In order that this may be accomplished, the bar 146 is provided at its upper end with a rearwardly extending flange 242 so that upon downward movement of the bar 146 the flange 246 will contact the inclined edge 236 of the faceplate, thus rotating it in a counterclockwise direction (Fig. 6) about the pivot pin 240. Since a downward movement of the bar 146 causes a lateral movement of the channel member 186 on which the monkey is mounted, the pivot pin 240 will be moved toward the left, as viewed in Fig. 6, and will pass immediately above a flanged portion 244 which extends forwardly from the lower edge of the upper bracket 106. Figs. 6 and 17 show the position of these various parts upon a partial actuation of the external control.

Since the faceplate 226 is yieldably held against the body portion of the monkey, it will be cammed outwardly in a rocking movement against a flange 246 which extends along the lower edge of said body portion. There is sufficient clearance between the inner end of flange 244 and the back side of the face plate to permit the outward rocking thereof. This movement removes the inturned lower edge 238 of the faceplate from the opening 188. Upon completion of the downward stroke of the bar 146, the inclined edge 236 will have been moved out of the path of the various stop members 152 thereon, and at the same time the lower inturned edge 238 will have been moved out of the path of the openings 188 in the channel member 186, thus leaving it free for its descent to the bottom. The flange 244, however, prevents downward movement of the monkey, because of the pin 240 resting thereon, until the two bars 146 and 186 have been sufficiently separated by reason of the upward movement of the bar 146. As this occurs, the channel member 186 returns to its normal position toward the right, thus moving the monkey and its pivot pin 240 toward the right until it clears the right-hand edge of the flange 244. When this position is reached the monkey will then be free and will immediately drop to the bottom of the channel member 186 and will be in the position shown in Fig. 7.

In its lowermost position the inwardly curved end 214 of the body portion will be in alignment with the rearmost extension 136 of the link 116 on the lowermost delivery means, so that upon the next succeeding downward movement of the bar 146 the lowermost delivery means will be operated in the manner heretofore described. However, during this operation it is necessary to reset the faceplate of the monkey to its normal position so that it may be moved upwardly to the next succeeding delivery means upon each actuation of the external control. In order to do this I provide the transversely extending member 198, secured to the bottom of the channel member 186, with a rearwardly extending pin 248, on which is pivotally mounted an elongated arm 250. The lower end of this arm passes through a slot in a flange 252 which extends forwardly along the bottom edge of the lower bracket 108. The upper end of this arm 250 has a normal unactuated position as shown in Fig. 7, and is located immediately behind the flanged inclined edge 236 of the faceplate. It will be clear that upon each actuation of an external control which causes a downward movement of the bar 146 and a lateral movement of the channel 186, the transverse member 198 will be a moved toward the left, as viewed in Figs. 7 and 8, carrying with it the pivot pin 248. Since the lower end of the arm 250 remains in substantially the same position by reason of the slot through which it extends, the upper end thereof will be moved toward the left, to the position shown in Fig. 8. This operation occurs upon each actuation of the external control. However, when the monkey has been dropped to the bottom, as shown in Fig. 7, the next actuation of the control will move the upper end of the arm 250 toward the left and carries with it the faceplate of the monkey by rotating it in a clockwise direction about its pivot pin 240 until the lower inturned edge 238 passes beyond the flange 246 and drops into the lowermost opening 188.

The monkey has, therefore, been followed through its complete cycle so that its operation will be obvious. Upon each actuation of the external control it will operate a delivery means, and upon each return of the control the monkey will be moved upwardly to operate the next succeeding delivery means. When it reaches the top, the faceplate thereof is automatically rotated out of the path of all stop means so that it may immediately drop to the bottom by gravity. During the actuation of the lowermost delivery means, the faceplate of the monkey is reset so that it may again continue its successive operation of the delivery means.

I have also provided a novel empty lock mechanism which is utilized in connection with a novel coin mechanism adaptor for returning a coin to a customer in the event that there is no article on the particular shelf of the operated delivery means. This mechanism also operates, however, to direct the coin to the coin box in the event that merchandise is delivered to the customer. Briefly, this mechanism consists of what might be termed a testing finger, one of which is located above each shelf within the hood or delivery means which partially surrounds the article thereon. An adoptor is provided which is located immediately below the coin mechanism and receives a coin upon each actuation of the external control. In the embodiment of the invention disclosed herein the coin box is positioned forwardly of the return coin chute. This specific arrangement, however, can be modified if so desired without departing from the spirit of the invention. Suitable mechanism is located between the testing finger and the adaptor so that, when an article of merchandise is delivered, the adaptor will be tipped to deposit the coin in the coin box but when a particularly delivery means is operated in the absence of an article the adaptor will then be tipped to deposit the coin in the return coin chute.

A particular feature of this phase of the invention is that, unlike empty locks heretofore known employing testing fingers, the finger is not yieldably held in a particular position. In the normal position of the delivery means, the testing finger is located at all times immediately adjacent the outermost edge of the shelf; that is, the edge adjacent the delivery chute, so that a serviceman may easily reload the machine without the necessity of having to move the testing finger while so doing. The arrangement is such that, when a delivery means is operated in the absence of an article, the testing finger remains stationary, but when operated in the presence of an article this article bears against the testing finger and moves it outwardly to actuate the adaptor and direct the coin to the coin box. This phase of the invention will now be described in detail.

Fig. 10 shows somewhat diagrammatically the relationship between the various parts about to be described, while Figs. 11 and 12 show the testing finger in its various positions before and after delivery of an article of merchandise. The details of operation of the adaptor in connection with the coin mechanism are shown in various positions in Figs. 13, 14 and 15 so that in describing the empty lock reference will be made to Figs. 10 and 15, inclusive.

Referring now particularly to Fig. 10, the testing finger, one of which is located immediately above each of the shelves 98 and within the confines of the hood or delivery means 100, consists of a substantially vertical end portion 254, and a substantially horizontal portion 256. The arm 256 and its connected finger 254 are mounted for pivotal movement about a vertically extending rod 258 which, as shown for example in Fig. 7, is located in one corner of the flanged supporting plate 90. This rod extends throughout substantially the entire length of the magazine, and the various testing fingers are located thereon in spaced apart relation so that one can be provided for each delivery means. A plurality of vertically spaced apart slots are also provided in the same corner of the supporting plate so that the rearmost ends of the testing fingers can extend therethrough and be mounted on the rod 258.

The rearmost end of the testing finger then extends at substantially right angles to the arm 256, as shown at 260, and on the opposite side of the rod 258 a portion 262 is provided which normally bears against the front side of the supporting plate 90. The supporting plate therefore acts as a stop to prevent movement of the finger inwardly beyond the position shown in Fig. 10. However, pivotal movement of the finger outwardly is permitted upon operation of the delivery means.

Immediately adjacent the magazine, a channel bar 264 is located. In the embodiment of the invention disclosed herein where there are shown four magazines and two delivery chutes, one of these bars 264 is located between two magazines and at the rear of a delivery chute. The location of this bar with respect to the magazines may best be seen in Fig. 3 where it will be apparent that the extensions 260 of each testing finger in the magazines opposite each side of a delivery chute extend toward each other and terminate closely adjacent the forward side of the channel bar 264. This bar is mounted for movement in substantially an arc and may be reciprocated in a forward and rearward direction. For example, the top of the bar is provided with a pin 266 which extends between the legs or flanges thereof. Links 268 are provided, one at each side of the channel bar and pivotally mounted one on each end of the pin 266. These links normally extend downwardly and rearwardly and are connected together at their lower ends by another pin 270 and supported by forwardly extending ears 272 on a bracket 274 mounted on the back of the cabinet.

The lower end of the channel bar 264 is similarly mounted and is provided with a pin 276 extending between the legs or flanges thereof, the outer ends of which carry similar links 278. These links also extend downwardly and rearwardly substantially parallel to the upper links 268, and a pin 280 extends between the lower ends thereof, which in turn is mounted in upwardly extending spaced apart ears 282 of an angle member 284. This angle member extends substantially the width of the cabinet and is secured to the back thereof so that the various parts of the mechanism may be mounted thereon. In the web of the channel bar 264, at its lower end, a vertical slot 286 is provided so that the upper end of a link 288 can be received, which link is also rotatably mounted on the pin 276. This link 288 extends downwardly and forwardly and its lower end is pivotally secured to the forward end of an arm 290, the rear end of which is secured to a shaft 292 which also extends substantially the width of the cabinet. At the right-hand end of the shaft 292 another arm 294 is secured which extends forwardly and has pivotally secured to its forward end a downwardly and forwardly extending link 296, which in turn is pivotally connected to the lower end of a forwardly and upwardly extending link 298. The adaptor or carriage member 300 is connected to the juncture of the links 296 and 298 and is comprised of two spaced apart sides, only one of which is shown in full lines in the drawings. It will be noted that this carriage is located immediately below the coin mechanism and the side thereof shown in dotted lines in Fig. 10 is provided with an upwardly extending arm 299 which is pivotally connected to the supporting plate 302 of the coin mechanism. The sides of the carriage are held in spaced apart relation by means of the pins 301 and 303. The space between the sides of the carriage is sufficient to receive the coin which is necessary to the operation of the machine.

The coin mechanism in general which is used forms no part of the present invention and is similar to many such mechanisms now in use. However, it is necessary to describe a portion of this mechanism as it directly affects the operation of the adaptor or carriage which in turn directs the coin either to the coin box or to the return coin chute. As is customary in coin mechanisms, a supporting plate 302 is provided on which all of the mechanism is mounted. Other plates and members are mounted thereon in close proximity thereto so that various coin chutes can be provided. Figs. 13, 14, and 15 show the lower portion of such a coin mechanism wherein a member 304 is mounted for rotative movement about a pin 306 secured to the supporting plate 302. This member 304 is located on the opposite side of the supporting plate from that shown in these figures. The upper edge of the member 304 is recessed as at 308 for the purpose of receiving a deposited acceptable coin 310. If the coin is not an acceptable one, the usual means are provided for immediately directing the coin to the return coin chute. However, the acceptable coin, upon being deposited, is received in the recess 308 of the member 304 and will be located as indicated in Fig. 13. An arcuate slot 312 is located in the supporting plate 302 through which a pin 314 secured to the member 304 extends and which the pin 314 is adapted to traverse. A link 316 is pivotally secured at one end to the pin 314 and at its other end is provided with a pin 318 which is adapted to traverse an elongated slot 320 in the link 298.

The pin 318 is also secured or may be made integral with one arm 322 of a bell crank lever, the other arm of which, indicated at 324, extends forwardly, and the juncture of the two arms is pivotally mounted on a pin 326 secured to the supporting plate 302. The forward end of the arm 324 is connected to a pin 328 which, in turn, pivotally supports the lower end of an actuating arm 330, which arm extends in a substantially vertical direction upwardly from the arm 324. A bracket 332 is mounted on the forward side of the arm 330, which has on one side thereof a plurality of vertically spaced apart horizontally extending pins 334. Forwardly of the bracket 332 a member 336 is secured to the shaft 165 and is provided with a curved edge at its rear side, which in turn has a plurality of spaced apart teeth 337. The bracket 332, with its pins 334, and the member 336, with its teeth 337, act in the manner of a rack and pinion, the pins being received between the teeth 337 so that upon a clockwise rotation of the shaft 165 a similar rotation will be imparted to the member 336 to cause an upward movement of the actuating arm 330.

As the actuating bar 330 moves upwardly, the bell crank lever, including the arms 322 and 324, rotates in a counterclockwise direction, carrying with it the link 316 and member 304 carrying the coin 310. Adjacent the bell crank lever, an arm 338 is mounted for rotation about its upper end by means of the pivot pin 340. Another pin 342 extends laterally from the arm 338 intermediate its two ends and extends through an opening 344 in the supporting plate 302. The opening 344 is sufficiently large as to permit a limited rotative movement of the arm 338. This arm is yieldably held in a forward position with its pin against the forward edge of the opening 344 by means of a tension spring 346 having one end thereof secured to the pin 326 and its other end secured to the arm 338 by means of the pin 348. The lower end of this arm has a forward extension 350 which acts normally as a stop member to limit the rotative movement in a counterclockwise direction fo the bell crank lever. When there is no coin in the mechanism and the external control is actuated, the bell crank lever is permitted to rotate until the edge 352 thereof abuts against the extension 350 on the arm 338.

However, when a coil 310 is lodged in the member 304, as shown in Fig. 13, and the corresponding external control is actuated, the coin also travels in an arcuate path with the member 304, but just before the edge 352 meets the stop 350 the coin will bear against the pin 342, thus acting as a cam to rotate the arm 338 in a clockwise direction and remove the stop 350 from the path of the bell crank lever and its edge 352. After the removal of the stop member 350, the bell crank lever is permitted to continue its rotative movement upon continued actuation of the external control until the position as shown in Fig. 14 is reached, at which time the member 304 will have been sufficiently rotated so that the coin 310 will drop by gravity out of the recess 308 and will be received in the carriage or adaptor 300. It should be noted that the coin is confined and directed by means of a relatively short coin chute, the sides of which are indicated by the dotted lines 354 and 356 in Figs. 14 and 15. As the coin drops downwardly and is received in the carriage or adaptor 300 it is held in a neutral position by resting on the pin 301 and the rear edge of the coin chute 356. From this neutral position the coin can be directed either to the coin box or the return coin chute depending upon the action of the carriage or adaptor 300. In this connection it should be noted that a pin 358 secured to the lower end of the link 298 extends through and traverses a slot 360 in the forward end of the link 296. Upon initially actuating the external control, which causes a counterclockwise rotation of the bell crank lever and the member 304, the link 298 will be moved toward the left slightly, the pin 358 moving to the end of the slot 360 from its position in Fig. 13 to its position in Fig. 14 thereby permitting the carriage or adaptor 300 to move slightly from its position in Fig. 13 to the position shown in Fig. 14.

Assuming for the moment that the particular delivery means being operated is empty, the coin 310 will thus remain in its neutral position as shown in Fig. 14 until completion of the stroke. When the various parts of the coin mechanism have been returned to normal, as shown in Fig. 13, the carriage or adaptor 300 will also have been moved to its normal position, thus permitting the coin 310 to drop downwardly on the left-hand side of the pin 301 where it drops into the return coin chute.

The operation of these various parts when an article of merchandise is actually being delivered is as follows: Initially the testing finger and delivery means are in the position shown in Fig. 10 and the coin mechanism will be as shown in Fig. 13. As the external control is actuated and the hood 100, which partially surrounds the article, is moved outwardly into the delivery chute carrying with it the article thereon, such article will bear against the end 254 of the testing finger, thus rotating it in a clockwise direction. As the testing finger rotates the lateral extension 260 at its rear end will be moved rearwardly against the channel bar 264 thus also moving the bar rearwardly. Rearward movement of the bar will cause a counterclockwise rotation of the shaft 292 by reason of the links 288 and 290 which in turn will cause an upward movement of the links 294 and 296. This movement rotates the carriage or adaptor 300 to the position shown in Fig. 15. In the meantime the coin 310 has been resting on the pin 301 but when the carriage is moved to its position shown in Fig. 15 by reason of the presence of an article in the delivery means the coin will obviously fall downwardly on the right-hand side of the pin 301 and thus be directed into the coin box.

As soon as the article has been delivered, pressure against the testing finger will cease and the weight of the bar 264 with its tendency to return to normal position will do so and carry with it the testing finger so that its position immediately after delivery will be as shown in Fig. 12. Thereafter, upon release of the external control, the delivery means will return to its normal position but no further movement of the testing finger will take place. It will remain in position as shown in Fig. 12. It will also be evident that when a delivery means is actuated in the absence of an article of merchandise it will be moved freely to the position shown in Fig. 12 but will not effect movement of the testing finger, which remains always in the position shown in Fig. 12. Since the testing finger will not be moved the bar 264 remains stationary and the carriage or adaptor 300 will be moved only to its position as shown in Fig. 14, whereupon return of the delivery means will simultaneously cause a delivery of the coin to the return coin chute in the manner above explained.

As stated heretofore, the machine is provided with two separate coin mechanisms; one mounted on the door for permitting actuation of the gum and nut dispensing means and the other on the inside of the cabinet to permit actuation of the candy dispensing means. Fig. 16 discloses the specific means which we have found desirable for use in directing the coins of different denominations to their respective coin mechanisms.

In the embodiment of this feature as shown, it is designed particularly for use with pennies and nickels. It will be understood, however, that the mechanism may be modified by those skilled in the art so as to separate coins of other denominations, such as nickels and dimes or dimes and quarters. Referring to Fig. 16 the coin chute is indicated at 362, the coins passing through this chute from the coin slot 24 at the front of the machine. One side of the coin chute is provided with an opening which is bounded at its upper side by a downwardly extending flange 364 and at its lower side by an upwardly extending flange 366, the opening itself being indicated at 368. The size of the opening 368 in this particular embodiment is such as to permit a penny to pass therethrough but the diameter of a nickel is such that the flanges 364 and 366 will confine this latter coin to the chute and thus carry it past the slot 368.

In the opposite side of the coin chute I provide a slot 370 and a spring arm 372 which extends into the coin chute at one end thereof and is secured at its other end to the main body of the chute beyond one end of the slot 370. The operation is such that when a nickel is deposited it will be carried past the slot 368 and will be deposited in the nickel coin mechanism. The weight of the coin will be such that the spring 372 will not impede its passage through the coin chute. If, however, a penny is deposited the end of the spring 372 extending into the path of movement thereof will force it outwardly of the chute, through the opening 368 and into the cup 374 which in turn directs it to the penny coin mechanism. It will thus be seen that novel means has been provided whereby, in a machine where more than one coin mechanism is used, only a single coin slot is necessary, the coins being directed to their respective mechanisms by the means just described.

From the foregoing description it will be evident that I have provided a machine of compact construction enabling a rather large quantity of various merchandise to be stored in a comparatively small cabinet.

Numerous advantages arise from the construction of the various elements employed, such as the automatic re-setting of the monkey. By this construction it is not necessary for a service man to gain access to the rear of the machine for manually re-setting this device. As soon as it has reached the top of a particular storage magazine it immediately returns to the bottom, thus enabling a service man to quickly re-load the machine. This arrangement also guarantees that the fresh or most recently deposited articles will be dispensed last.

The novel empty lock mechanism also enables a service man to completely re-load the machine in a shorter period of time by obviating the necessity of manually moving the testing finger out of the path of an article. The testing finger remains at all times in such a position that the machine can be re-loaded without having to move it.

The mechanism also insures that if in re-loading the machine a service man should miss a shelf, when the monkey reaches the empty shelf the coin will be returned and upon re-depositing the coin the monkey will have climbed to the next successive shelf and will dispense the article thereon. This has the advantage of not completely locking the machine when an empty shelf is reached.

The arrangement of the actuating levers of the candy magazines is such that upon opening the door these levers will be disconnected from the external controls and when the door is closed connection is ordinarily made between the levers and the controls, so that a service man need spend no time in making these connections manually.

As will be apparent, one of the features of the construction of the apparatus herein described is the accessibility of the storage magazines, both in the cabinet and on the door, which is made possible by the fact that the set of magazines on the door can be swung outwardly away from the magazines in the cabinet, resulting in a decrease in the time required to service the unit. It will be understood that in describing the magazines "on the door" it is intended to cover the idea not only of using a single door but also of using an auxiliary door containing the magazines, the auxiliary door being intermediate between the cabinet and the front door and disposed in such a way that it can be swung away from the cabinet.

Having thus described my invention, what I claim as new and desire to secure by Letters Patent of the United States, is:

1. In a vending machine of the character described, a plurality of fixed article supports, individual delivery means associated with each support operable to positively remove an article from said support, a single external control, and means connected with said control and responsive to each actuation thereof for successively operating said delivery means.

2. In a vending machine of the character described, a plurality of fixed article supports, individual delivery means associated with each support, releasable locking means normally maintaining each delivery means against movement, and means for successively releasing the locking means and operating said delivery means.

3. In a vending machine of the character described, a plurality of fixed article supports, individual delivery means associated with each support, releasable locking means normally maintaining each delivery means against movement, a single external control, and means connected with said control and responsive to each actuation thereof for successively releasing the locking means and operating said delivery means.

4. In a vending machine of the character described, a plurality of fixed article supports, individual delivery means associated with each support, releasable locking means normally maintaining each delivery means against movement, and means having multidirectional movements for successively releasing the locking means and operating said delivery means.

5. In a vending machine of the character described, a plurality of fixed article supports, delivery means associated with each support, releasable locking means normally maintaining each delivery means against movement, a single external control, actuating mechanism capable of multi-directional movements in response to operation of said control, means for releasing a locking means and operating the delivery means upon movement of said mechanism in one direction, and means for advancing said releasing and operating means to the next succeeding support upon movement of said mechanism in another direction.

6. In a vending machine of the character described, a plurality of fixed article supports, delivery means associated with each support, two substantially parallel bars adjacent said supports, one of said bars being mounted for vertical reciprocation and the other for lateral reciprocation, a single external control, means connecting said control with said bars whereby actuation thereof will cause reciprocation of said bars, and means on one of said bars to operate a delivery means upon actuation of said control.

7. In a vending machine of the character described, a plurality of fixed article supports, delivery means associated with each support, two substantially parallel bars adjacent said supports, one of said bars being mounted for vertical reciprocation and the other for lateral reciprocation, a single external control, means connecting said control with said bars, whereby actuation thereof will cause reciprocation of said bars, means on one of said bars to operate a delivery means upon actuation of the control, and means on the other bar to advance the last named means to the next successive delivery means.

8. In a vending machine of the character described, a plurality of article supports, delivery means associated with each support, actuating means for successively operating said delivery means, and means for automatically returning said actuating means to its original starting point after having operated all of the delivery means.

9. In a vending machine of the character described, a plurality of vertically spaced article supports, delivery means associated with each support, actuating means for successively operating said delivery means, means for advancing said actuating means in step by step movement, and means for automatically returning said actuating means to the lowermost support after operation of the uppermost delivery means.

10. In a vending machine of the character described, a plurality of article supports, delivery means associated with each support, a vertically movable monkey for successively operating said delivery means, means normally holding said monkey against downward movement, and means automatically operable to permit free downward movement thereof after it has reached the uppermost support.

11. In a vending machine of the character described having a plurality of article supports therein and delivery means associated with each support, a vertically movable monkey having a main body portion for successively operating said delivery means, a face plate movably mounted on said main body portion and yieldably held thereagainst, said monkey being normally held against downward movement in one position of said face plate, but freely movable vertically when said face plate is in another position.

12. In a vending machine of the character described, a plurality of article supports, delivery means for each support, a vertically movable monkey having a main body portion for successively operating said delivery means, a face plate movably mounted on said main body portion and yieldably held thereagainst, said monkey being held against downward movement in the normal position of said face plate, and means to move said face plate out of normal position after operation of the uppermost delivery means, to thereby permit the monkey to drop freely to the lowermost delivery means.

13. In a vending machine of the character described, a plurality of article supports, delivery means for each support, a vertically movable monkey having a main body portion for successively operating said delivery means, a face plate movably mounted on said main body portion and yieldably held thereagainst, said monkey being held against downward movement in the normal position of said face plate, means to move said face plate out of normal position after operation of the uppermost delivery means to thereby permit the monkey to freely drop to the lowermost delivery means, and means to move said face plate back to normal operative position upon operation of said lowermost delivery means.

JOHN W. CARLSON.

REFERENCES CITED

The following references are of record in the file of this patent:

UNITED STATES PATENTS

| Number | Name | Date |
| --- | --- | --- |
| 229,712 | Junkin | July 6, 1880 |
| 739,418 | Hurd | Sept. 22, 1903 |
| 872,653 | Hart | Dec. 3, 1907 |
| 994,882 | Somers | June 13, 1911 |
| 1,021,723 | Morse | Mar. 26, 1912 |
| 1,087,748 | Fanning | Feb. 17, 1914 |
| 1,125,037 | Bachman | Jan. 19, 1915 |
| 1,483,777 | Callahan | Feb. 12, 1924 |
| 1,788,523 | Jennings et al. | Jan. 13, 1931 |
| 1,869,070 | McLaren | July 26, 1932 |
| 1,941,781 | Antoine et al. | Jan. 2, 1934 |
| 1,977,543 | Casau | Oct. 16, 1934 |
| 2,073,870 | Johns | Mar. 16, 1937 |
| 2,078,984 | Williamson | May 4, 1937 |
| 2,122,550 | Adrian | July 5, 1938 |
| 2,199,213 | Traphan | Apr. 30, 1940 |
| 2,218,831 | Sargent | Oct. 22, 1940 |
| 2,285,435 | Holcomb | June 9, 1942 |